(12) United States Patent
Yeh et al.

(10) Patent No.: US 8,884,931 B2
(45) Date of Patent: Nov. 11, 2014

(54) HANDWRITING INPUT APPARATUS

(75) Inventors: Chia-Jui Yeh, Taipei (TW); A-Li Wong, Hsin-Chu (TW)

(73) Assignee: Waltop International Corporation, Hsinchu (TW)

( * ) Notice: Subject to any disclaimer, the term of this patent is extended or adjusted under 35 U.S.C. 154(b) by 253 days.

(21) Appl. No.: 13/612,257

(22) Filed: Sep. 12, 2012

(65) Prior Publication Data

US 2013/0342510 A1 Dec. 26, 2013

(30) Foreign Application Priority Data

Jun. 21, 2012 (TW) .............................. 101211980 U

(51) Int. Cl.
*G06F 3/033* (2013.01)

(52) U.S. Cl.
USPC ........................................................ 345/179

(58) Field of Classification Search
CPC ................ G06F 3/03545; G06F 3/046; G06F 2200/1632; G06F 11/1068; G06F 13/10; G06F 1/26; G06F 1/3206; G06F 2217/78; G06F 1/3203

USPC .......................................................... 345/179
See application file for complete search history.

(56) References Cited

U.S. PATENT DOCUMENTS

| | | | |
|---|---|---|---|
| 2008/0055279 A1* | 3/2008 | Osada et al. | 345/179 |
| 2008/0128180 A1* | 6/2008 | Perski et al. | 178/18.03 |
| 2013/0106723 A1* | 5/2013 | Bakken et al. | 345/173 |
| 2013/0162589 A1* | 6/2013 | Lien et al. | 345/174 |

* cited by examiner

*Primary Examiner* — Lixi C Simpson
(74) *Attorney, Agent, or Firm* — Muncy, Geissler, Olds & Lowe, P.C.

(57) ABSTRACT

A handwriting input apparatus used with an electromagnetic pen is disclosed. The handwriting input apparatus comprises a controller, an electromagnetic antenna board, a signal processing circuit and a charging circuit. The signal processing circuit processes the electromagnetic signals received by the electromagnetic antenna board. The charging circuit used to charge the electromagnetic pen includes a first device which is used to output a first voltage to charge the electromagnetic pen after a voltage of the handwriting input apparatus being inputted. The charging circuit further includes a programmable voltage device connecting to the first device. The programmable voltage device is controlled by the controller to change the first voltage according to the detection of the first voltage by the controller.

10 Claims, 4 Drawing Sheets

HANDWRITING INPUT APPARATUS

BACKGROUND OF THE INVENTION

1. Field of the Invention

The present invention generally relates to a handwriting input apparatus, and more particularly to a handwriting input apparatus with a programmable charging circuit.

2. Description of the Related Art

Electromagnetic type of handwriting input apparatus such as a tablet, or a digitizer usually further includes a stylus or an electromagnetic pen. An electromagnetic pen generally includes a circuit with capacitors and inductors. A digitizer generally has a plurality of antenna loops, analog to digital converter, amplifiers, a processor or a control IC on a printed circuit boards, which are used for sensing electromagnetic signals from the electromagnetic pen, and for calculating the position, trace, variation of the frequency of the electromagnetic pen through a calculating process to display the position, and trace of the electromagnetic pen on a display device.

The operating principle of an electromagnetic type handwriting input apparatus primarily involves a circuit board having a plurality of antenna loops arranged along the x axis or y axis, and an electromagnetic pen which is able to transmit electromagnetic signals to perform input actions. Current electromagnetic input apparatus, depending on the different types of electromagnetic pens, can be categorized as one type used with an electromagnetic pen with a battery and another type used with an electromagnetic pen without battery. The electromagnetic input technology applied in the electromagnetic input apparatus which uses an electromagnetic pen with a battery is known as active type electromagnetic input technology. Since the electromagnetic pen is able to operate by its own power to independently transmit signal, the electromagnetic input apparatus using active electromagnetic input technology does not need to transmit extra energy to power up the electromagnetic pen.

The electromagnetic input apparatus which uses an electromagnetic pen with a battery usually has a charger function to charge the electromagnetic pen. The invention provides a handwriting input apparatus with a programmable charging circuit and an electromagnetic pen so that the charging of the electromagnetic pen is able to be programmed and controlled according to the requirement, and the charging of the electromagnetic pen is more convenient and efficient.

SUMMARY OF THE INVENTION

One object of the invention is to provide a handwriting input apparatus with a programmable charging circuit and an electromagnetic pen so that the charging of the electromagnetic pen is able to be programmed and controlled according to the requirement, and the charging of the electromagnetic pen is more convenient and efficient.

The invention provides a handwriting input apparatus with an electromagnetic pen. The handwriting input apparatus comprises a controller, an electromagnetic antenna board, a signal processing circuit and a charging circuit. The electromagnetic antenna board is controlled by the controller to receive electromagnetic signals from the electromagnetic pen. The signal processing circuit processes the electromagnetic signals. The charging circuit comprises a first device and a programmable voltage device. The controller transmits a signal to the first device so that the first device provides a first voltage to charge the electromagnetic pen. The programmable voltage device connects to the first device, the controller detects the first voltage and controls the programmable voltage device so as to change the first voltage by the first device.

The electromagnetic pen of the invention comprises a power source, a LC circuit, a second device and a third device. The LC circuit transmits the electromagnetic signals. The power source provides a voltage to the second device. The second device provides the LC circuit with a second voltage. The third device controls the second device to raise the voltage or not according to the second voltage.

DETAILED DESCRIPTION

Implementation of this invention will be described in detail below. However, in addition to as described below, and this invention can be broadly implemented in the other cases the purpose and scope of this invention is not affected by the application of qualified, claim after its prevail. Furthermore, to provide a description more clear and easier to understand the invention, the pieces within the schema and not in accordance with their relative size of drawing, compared to certain dimensions to other scales have been exaggerated; details not related nor completely drawn in part in order to schematic simplicity.

Figure 1:
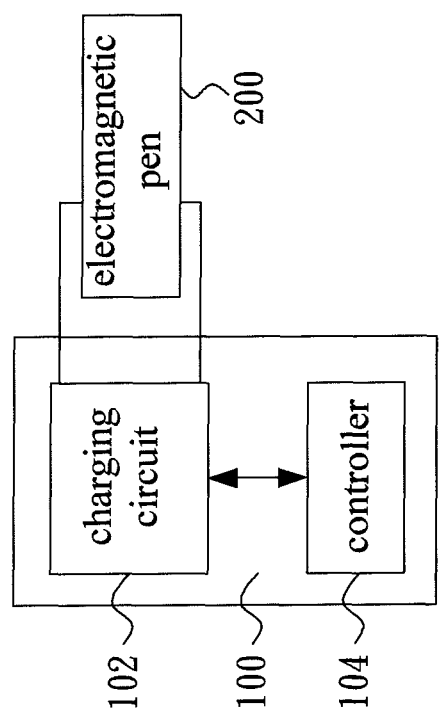
FIG. 1 shows a schematic diagram of a handwriting input apparatus according to one embodiment of the invention.

FIG. 1 shows a schematic diagram of a handwriting input apparatus according to one embodiment of the invention. The handwriting input apparatus 100 comprises a controller 102, a charging circuit 104 and an electromagnetic pen 200 connecting to the charging circuit 104. The handwriting input apparatus 100 further comprises an electromagnetic antenna board with a plurality of antenna loops or sensor coils arranged along the x axis direction and the y axis direction parallel to each other and partially overlapping on a substrate and a signal processing circuit. Each the electromagnetic antenna loop or sensor coil on the substrate connects to a switch which is controlled by the controller 102 to switch to the antenna loop or sensor coil to transmit or to receive electromagnetic signals. The signal processing circuit processes the electromagnetic signals from the electromagnetic pen 200 received by the antenna loop or the sensor coil. The electromagnetic antenna board and the signal processing circuit of the handwriting input apparatus can be practiced by any technology of the related art, it will be understood by those of skill in the art that other embodiments, equivalent changes or modifications are within the scope of this invention.

Figure 2:
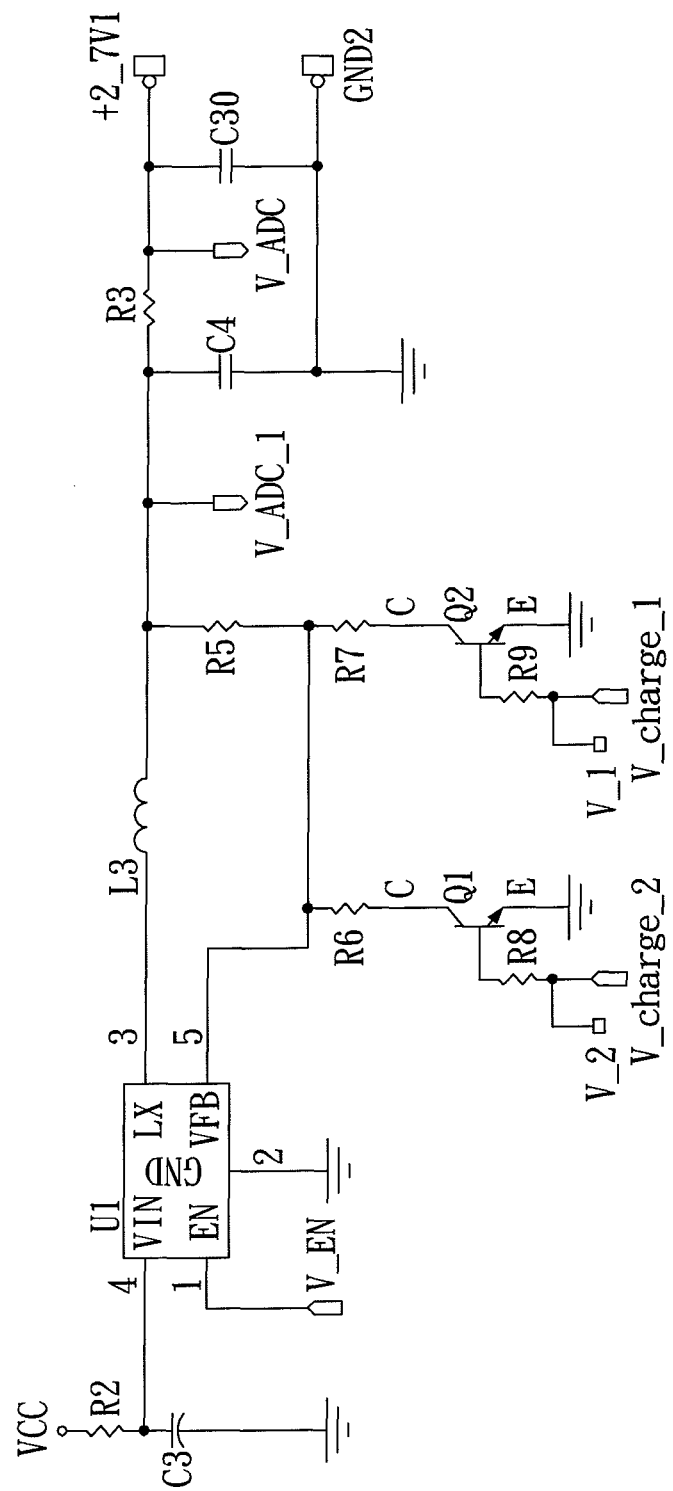
FIG. 2 shows a charging circuit of the handwriting input apparatus according to one embodiment of the invention.

FIG. 2 shows a charging circuit of the handwriting input apparatus according to one embodiment of the invention. Device U1 is used to control the charging circuit. Pin 1 of device U1 is connected to the controller 102, and the device U1 is able to be turned on by voltage V_EN provided by the controller 102. Pin 5 of device U1 is connected to terminals of the resistors R6 and R7, and one terminal of the resistor R5 to determine a feedback voltage. Pin 4 of device U1 is connected to one terminal of resistor R2 and one terminal of capacitor C3. The other terminal of resistor R2 is connected to input voltage Vcc from the handwriting input apparatus. Voltage Vcc is inputted via pin 4 of device U1. The other terminals of resistor R6 and R7 are connected to collectors of transistors Q1 and Q2 respectively. Emitters of transistors Q1 and Q2 are grounded. Base electrodes of transistors Q1 and Q2 is connected to terminals of the resistors R8 and R9. The other terminals of the resistors R8 and R9 are connected to the controller 102. The controller 102 provides voltage signals V1 and V2 to control base electrodes of transistors Q1 and Q2. The controller 102 controls transistors Q1 and Q2 as switches. When transistors Q1 and Q2 are turned on by the controller 102, electric currents flow through resistor R6 and R7. The other terminal of resistor R5 is connected to one terminal of resistor R3 and one terminal of inductor L3. The other terminal of inductor L3 is connected to pin 3 of device U1. Charging voltage and charging current are provided and outputted through Pin 3 of device U1. Two terminals of resistor R3 is further connected to the controller 120 so that the controller 120 is able to measure the voltage between the two terminals of resistor R3 and to detect the charging status. Terminals of capacitors C4 and C30 are connected to one terminal of resistor R3, the other terminals of capacitors C4 and C30 are grounded. Through the signals provided by the controller 102, resistors R5-R9 as well as transistors Q1 and Q2 constitute a programmable voltage device, the signals provided by the controller 102 depend on output voltages from pin 3 of device U1.

Figure 3:
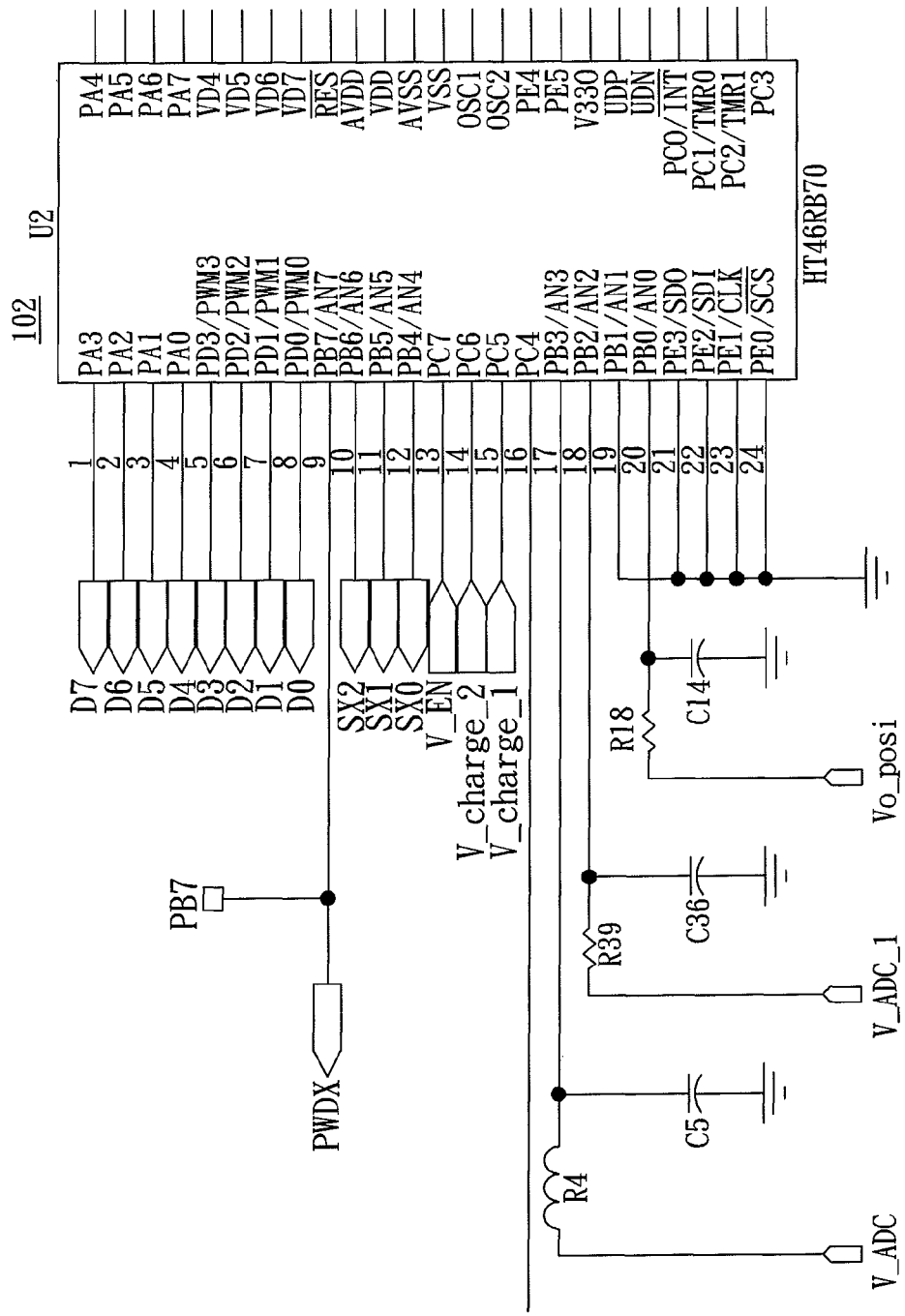
FIG. 3 shows a controller of a handwriting input apparatus according to one embodiment of the invention.

FIG. 3 shows a controller of a handwriting input apparatus according to one embodiment of the invention. Please refer to FIG. 2 again, pin 13 of the controller 102 is connected to pin 1 of device U1 so that the controller 102 is able to provide voltage V_EN to turn on the device U1. Pin 14 and pin 15 of the controller 102 are connected to the other terminals of the resistors R8 and R9 respectively to control the transistors Q1 and Q2. The controller 102 uses voltage V_ADC and V_ADC_1 to detect charging status through pin 17 and pin 18. Through a suitable firmware program, when the electromagnetic pen 200 is connected to the charging circuit 104 for charging, the controller 102 outputs signals to control transistors Q1 and Q2 so as to determine the feedback voltage and adjust the output voltage Lx according to the detected charging status.

Figure 4:
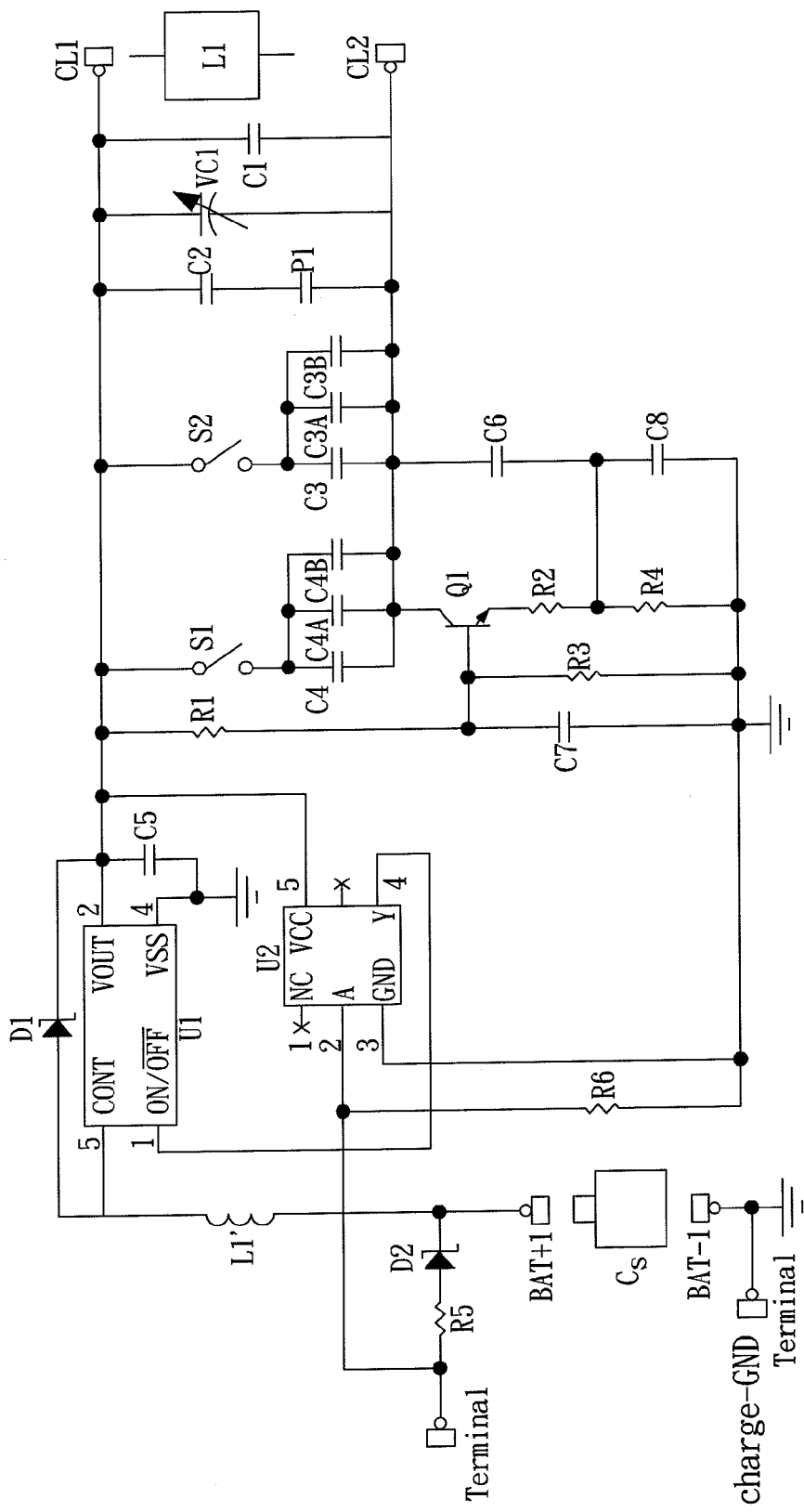
FIG. 4 shows an internal circuit of an electromagnetic pen according to one embodiment of the invention.

FIG. 4 shows an internal circuit of an electromagnetic pen according to one embodiment of the invention. The circuit of an electromagnetic pen comprises a LC circuit and a control circuit. The LC circuit of the electromagnetic circuit comprises switches S1 and S2. Switches S1 and S2 connect capacitors C4, C4A and C4B and C3, C3A and C3B in series respectively, while capacitors C4, C4A and C4B are connected in parallel, and capacitors C3, C3A and C3B are also connected in parallel. The electromagnetic pen is able to perform different functions through switches S1 or S2 to change the capacitance of LC circuit. Other devices in the circuit of the electromagnetic pen comprises coil type inductor L1, capacitors C1, C2, and C5-C8, transistors Q1, resistors R1-R5, capacitors P1 and VC1. The circuit of the electromagnetic pen set forth is only one embodiment of the invention, not a limit; any other suitable circuit could be applied on the electromagnetic pen of the invention.

The LC circuit of the electromagnetic pen is powered by a power source comprising super capacitor Cs, but not limited to a super capacitor. One terminal of resistor R5 of the charging circuit is connected to the anode of the charging terminals, while the other terminal of the resistor R5 is connected to the anode of Schottky diode D2. The cathode of Schottky diode D2 is connected to one terminal of inductor L1' and one terminal of super capacitor Cs. The other terminal of super capacitor Cs is connected to the cathode of the charging terminals and is grounded. The other terminal of Inductor L1' is connected to the anode of Schottky diode D1 and pin 5 of device U1. The cathode of Schottky diode D1 is connected to pin 2 of device U1 and one terminal of capacitor C5. Pin 4 of device U1 is connected to the other terminal of capacitor C5 and is grounded. The terminal of resistor R5 connecting to the anode of the charging terminals is also connected to pin 2 of device U2 and one terminal of resistor R6. The other terminal of resistor R6 is grounded. Pin 5 of device U2 is connected to pin 2 of device U1.

Pin 2 of device U1 is used to raise the voltage inputted to the LC circuit of the electromagnetic pen, and voltage Vout of pin 2 of device U1 is used as input voltage of pin 5 of device U2. Device U2 turns on or off device U1 according to input voltage of pin 5 of device U2. Device U2 turns on or off device U1 through the connection between pin 1 of device U1 and pin 4 of device U2. Device U2 comprises an inverter, while device U1 comprises a voltage converter device. When voltage Vcc inputted to pin 5 of device U2 is a high voltage, pin 4 of device U2 will output a low voltage to turn off device U1. When voltage Vcc inputted to pin 5 of device U2 is a low voltage, pin 4 of device U2 will output a high voltage to turn on device U1 to raise the voltage inputted to the LC circuit of the electromagnetic pen. When the electromagnetic pen is in charging status, an electric current from the charging circuit of the handwriting input apparatus shown in FIG. 2 will flow through resistor R5 and Schottky diode D2 of the circuit of the electromagnetic pen shown in FIG. 4 to charge the power source comprising a super capacitor Cs of the electromagnetic pen.

Please refer to FIGS. 2 and 3, when the charge terminals of the electromagnetic pen are connected to the charge terminals of the charging circuit of the handwriting input apparatus with forward polarity and tight contact, the controller of the handwriting input apparatus shown in FIG. 3 will detect the voltage status of the electromagnetic pen to be charged. The controller outputs voltage V_EN through pin 13 to turn on device U1 in FIG. 2 and outputs voltage V_charge_2 via pin 14 to turn on transistor Q1 and to maintain transistor Q2 in off status so that resistors R5 and R6 in FIG. 2 are connected in series and a feedback voltage is inputted to pin 5 of device U1 in FIG. 2. Pin 3 of device U1 outputs a detecting voltage LX which is preferably about 2.8 volt, and a electric current will flow through resistor R3 in FIG. 2. The controller in FIG. 3 detects the voltage status of the electromagnetic pen to be charged through measuring the voltage across pins 17 and 18 of the controller.

Please refer to FIGS. 2, 3 and 4, if the controller of the handwriting input apparatus determines that the electromagnetic pen needs to be charged, the controller outputs voltage V_EN through pin 13 to turn on device U1 in FIG. 2 and outputs voltages V_charge_1 and V_charge_2 via pins 15 and 14 to turn on transistors Q1 and Q2 so that resistors R6 and R7 are connected in parallel and then connected to resistor R5 in series, and a feedback voltage is inputted to pin 5 of device U1 in FIG. 2. Pin 3 of device U1 outputs a higher voltage LX which is preferably about 3.75 volt, and an electric current will flow through resistor R3 in FIG. 2, the charging terminals of the handwriting input apparatus and then the power source of the electromagnetic pen to be charged. The controller in FIG. 3 continually measures the voltage across the two terminals of resistor R3 or the electric current through resistor R3 via pins 17 and 18 of the controller. During charging, the electric current from the charging circuit of the handwriting input apparatus shown in FIG. 2 continues to flow through resistor R5 and diode D2 of the circuit of the electromagnetic pen in FIG. 4 to charge the power source of the electromagnetic pen such as a super capacitor Cs. During charging, device U2 shown in FIG. 4 will not turn on device U1, and the electromagnetic pen will not operate. In one embodiment of the invention, since the predetermined voltage of the power source of the electromagnetic pen to be charged, the resistance and the forward voltage of the Schottky diode of the electromagnetic pen are known, the controller of the handwriting input apparatus only needs to measure the voltage across pins 17 and 18 and convert to the electric current flowing through resistor R3 so that the voltage of the power source of the electromagnetic pen can be obtained. For example, If the electric current flowing through resistor R3 of the handwriting input apparatus is 20 mA, the voltage between the charging terminals is 3.0 volt, and the resistance of resistor R5 and the forward voltage of Schottky diode D2 of the electromagnetic pen are 100 and 0.2 volt respectively, the voltage of the power source of the electromagnetic pen to be charged which is 2.6 Volt can be calculated by the controller of the handwriting input apparatus.

After the charging of the power source of the electromagnetic pen is completed (such as about 2.7 volt), the controller in FIG. 3 determines that the charging s completed through measuring the voltage across the two terminals of resistor R3 via pins 17 and 18 of the controller. meanwhile, the controller outputs voltages V_charge_1 and V_charge_2 via pins 15 and 14 to turn off transistors Q1 and Q2 so that no electric current flows through resistors R6 and R7, and resistor R5 and resistors R6 and R7 are not connected in series, and a feedback voltage is inputted to pin 5 of device U1 in FIG. 2. Pin 3 of device U1 outputs a lower voltage LX which is preferably about 0.6 volt and thus the charging of the power source of the electromagnetic pen is terminated.

When the electromagnetic pen has been fully charged or been charged to have enough power to be operated and is connected the charging circuit of the handwriting input apparatus, pin 3 of device U1 in FIG. 2 outputs a lower voltage LX which is not limited to 0.6 volt and can be designated according to actual requirement. Similarly, a threshold voltage value or a recharging voltage range which indicate that the power source of the electromagnetic pen needs to be charged is also able to be adjusted by setting a firmware in the controller in FIG. 3 or other means. the controller is able to be programmed to control the charging circuit to charge the electromagnetic pen whenever the power source of the electromagnetic pen is not fully charged.

As described and shown in the detailed description and figures set forth, the handwriting input apparatus with a programmable charging circuit and the electromagnetic pen of the invention are able to charge the electromagnetic pen according to the power status of the electromagnetic pen. The charging control of the electromagnetic pen is programmable by the controller of the handwriting input apparatus according to requirements so that the charging of the electromagnetic pen is able to be faster and more efficient. In addition, although the embodiment of the invention involves a handwriting input apparatus, but the technique of the invention is able to be applied to the field of the related art of the invention.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A handwriting input apparatus, comprising:
    an electromagnetic pen;
    a controller;
    an electromagnetic antenna board controlled by the controller to receive electromagnetic signals from the electromagnetic pen;
    a signal processing circuit processing the electromagnetic signals; and
    a charging circuit comprising
        a first device, the controller transmitting a signal to the first device so that the first device provides a first voltage to charge the electromagnetic pen; and
        a programmable voltage device connecting to the first device, the controller detecting the first voltage and controlling the programmable voltage device so as to change the first voltage by the first device.

2. The handwriting input apparatus of claim 1, wherein the electromagnetic pen comprises:
    a power source;
    a LC circuit, the LC circuit transmitting the electromagnetic signals;
    a second device, the power source providing a voltage to the second device, the second device providing the LC circuit with a second voltage; and
    a third device, the third device controlling the second device to raise the voltage or not according to the second voltage.

3. The handwriting input apparatus of claim 1, wherein the first device is turned on by the controller.

4. The handwriting input apparatus of claim 1, wherein the first device changes the first voltage according to a feedback voltage.

5. The handwriting input apparatus of claim 4, wherein the programmable voltage device comprises:
    a first resistor, a first terminal of the first resistor connecting to a first terminal of an inductor, a second terminal of the inductor connecting to a third pin of the first device, the third pin of the first device outputting the first voltage;
    a second resistor and a third resistor, first terminals of the second resistor and the third resistor connecting to a second terminal of the first resistor and a fifth pin of the first device;
    a first transistor and a second transistor, collectors of the first transistor and the second transistor connecting to second terminals of the second resistor and the third resistor respectively, emitters of the first transistor and the second transistor being grounded; and
    a fourth resistor and a fifth resistor, first terminals of the fourth resistor and the fifth resistor connecting to base electrodes of the first transistor and the second transistor, second terminals of the fourth resistor and the fifth resistor connecting to the controller.

6. The handwriting input apparatus of claim 5, wherein the charging circuit further comprises a sixth resistor, a first terminal of the sixth resistor is connected to the first terminals of the first resistor and the inductor, a second terminal of the sixth resistor is connected to an anode of the charging circuit, the first and second terminals of the sixth resistor is connected to the controller.

7. The handwriting input apparatus of claim 2, wherein the second device comprises a voltage converter device.

8. The handwriting input apparatus of claim 2, wherein the third device comprises an inverter.

9. The handwriting input apparatus of claim 2, wherein the electromagnetic pen further comprises:

a seventh resistor, a first terminal of the seventh resistor connecting to an anode of charging terminals of the electromagnetic pen; and a first Schottky diode, an anode of the first Schottky diode connecting to a second terminal of the seventh resistor, a cathode of the first Schottky diode connecting to an anode of the power source, the anode of the power source connecting to a fifth pin of the second device so as to input the voltage of the power source.

10. The handwriting input apparatus of claim 2, wherein a second pin of the second device is connected to the LC circuit and a fifth pin of the third device to output the second voltage and to input the second voltage to the third device.

* * * * *